3,453,316
4-(N-METHYL-N-ALLYL-AMINO)-PHENYL-N'-METHYL CARBAMATES
Rudolf Heiss, Cologne-Stammheim, Ingeborg Hammann, Cologne, and Wolfgang Behrenz, Cologne-Stammheim, Germany, assignors to Farbenfabriken Bayer Aktiengesellschaft, Leverkusen, Germany, a corporation of Germany
No Drawing. Filed Sept. 9, 1965, Ser. No. 486,192
Claims priority, application Germany, Sept. 18, 1964, F 44,009
Int. Cl. C07c 125/06, 125/00
U.S. Cl. 260—479       3 Claims

ABSTRACT OF THE DISCLOSURE

4 - (N-methyl-N-allyl-amino)-phenyl-N'-methyl carbamates which possess insecticidal and acaricidal properties, and which may be produced by conventional methods.

---

The present invention relates to particular new 4-(N,N-methyl-allylamino)-phenyl-N'-methyl-carbamates, which have insecticidal and acaricidal properties, to their compositions with carrier vehicles, and to the preparation and use thereof.

It is known that diallylamino-phenyl-N-methyl carbamates have insecticidal and acaricidal activities. In this regard, 3,5-dimethyl - 4 - diallylamino-phenyl-N-methyl-carbamate (A) is considered to be particularly effective (cf. French Patent No. 1,329,856).

It is an object of the present invention to provide particular new 4-(N-methyl-N-allyl-amino)-phenyl-N'-methyl-carbamate compounds which possess valuable pesticidal, and especially insecticidal and acaricidal properties, to provide active compositions in the form of mixtures of such compounds with solid and liquid dispersible carrier vehicles, to provide a process for producing such compounds, and to provide methods of using such compounds in a new way, especially for combatting pests, especially insects and acarids.

Other and further objects of the present invention will become apparent from a study of the within specification and accompanying examples.

It has been found in accordance with the present invention that the particular new 4-(N-methyl-N-allyl-amino)-phenyl-N'-methyl carbamates having the general formula

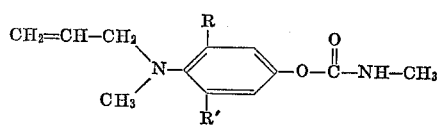

(I)

in which R is selected from the group consisting of methyl and hydrogen, and R' is methyl where R is methyl and isopropyl where R is hydrogen, have very strong pesticidal, especially insecticidal and acaricidal, properties.

The particular new carbamates of general Formula I are obtained by reacting a phenol having the general formula

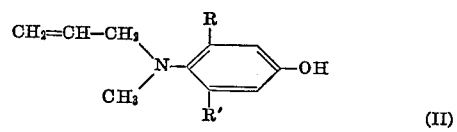

(II)

in which R and R' are the same as defined above, with methyl isocyanate, whereby to form the corresponding 4 - (N - methyl - N - allyl-amino)-phenyl-N'-methyl-carbamate.

Surprisingly, the particular carbamic acid esters according to the present invention have a markedly higher insecticidal and acaricidal activity than previously known biocidal carbamic acid esters.

The phenols used as starting material for the instant production process have not been previously described. These phenols can, however, be produced in known manner by allowing the corresponding 4-aminophenols to react with dimethyl sulfate in an aqueous solution at temperatures of 0 to +5° C., initially without the addition of a base. The monomethylamino-phenol thus obtained can be reacted subsequently with allyl bromide at temperatures of 0 to +60° C. in an aqueous solution containing sodium bicarbonate to form the corresponding 4-N,N-methyl-allylamino-phenol compound.

The process for the production of the instant carbamates is described below in greater detail, with the reaction proceeding according to the following equation:

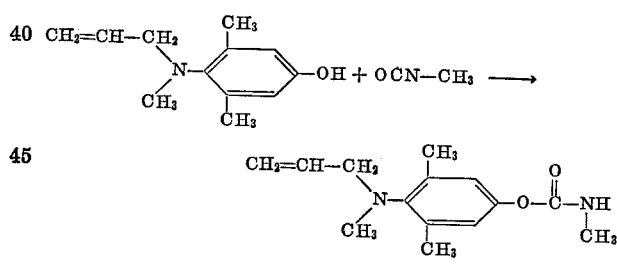

(III)

The reaction can be carried out in an inert solvent. Hydrocarbons, such as benzine and benzene, are, for example, suitable for this purpose, as well as ethers, such as dioxan, and the like. However, it is also possible to react the components directly, in the absence of a solvent.

The reaction is accelerated by the addition of a tertiary amine, such as triethylamine, etc.

The reaction temperatures may be varied within a fairly wide range. In general, the operation is carried out at a temperature substantially between about 0 and 150° C., and preferably substantially between about 20–100° C.

Advantageously, the compounds according to the present invention possess strong pesticidal, especially insecticidal and acaricidal, properties and effects, yet have a distinctly low toxicity towards warm-blooded creatures as well as a distinctly low phytotoxicity. The desired effects of the instant compounds appear rapidly and persist for a significantly long time. The present compounds can therefore, be used with markedly good results for combatting noxious sucking and biting insects, Diptera and mites.

In this connection, the sucking insects contemplated herein essentially include aphids, such as the peach aphid (*Myzus persicae*), the black bean aphid (*Doralis fabae*), and the like; coccids, such as *Aspidiotus hederae, Lecanium hesperidum, Pseudococcus maritimus*, and the like; Thysanoptera, such as *Mercinothrips femoralis*, and the like; and bugs, such as the beet bug (*Piesma quadrata*), the bed bug (*Cimex lectularius*), and the like.

Among the biting insects which come under consideration, there are included essentially butterfly larvae, such as *Plutella maculipennis, Lymantria dispar*, and the like; beetles, such as the grain weevil (*Calandra granaria*), the Colorado beetle (*Leptinotarsa decemlineata*), and the like, but also species living in the soil, such as wire worms (*Agriotes* sp.), white grubs (*Melolontha melolontha*), and the like; cockroaches, such as the German cockroach (*Blatella germanica*), and the like; Orthoptera, such as the cricket (*Gryllus domesticus*), and the like; termites, such as *Reticulitermes* and the like; and Hymenoptera, such as ants, and the like.

The Diptera contemplated herein particularly comprise the flies, such as the banana fruit fly (*Drosophila melanogaster*), the Mediterranean fruit fly (*Ceratitis capitata*), the house fly (*Musca domestica*), and the like; and gnats, such as the mosquito (*Aedes aegypti*), and the like.

Among the mites which may be considered, the following are of special interest: spider mites (Tetranychidae), such as the common spider mite (*Tetranychus telarius*), the fruit tree spider mite (*Paratetranychus pilosus*), and the like; gall mites, such as the red currant gall mite (*Eriophyes ribis*), and the like; Tarsonemides, such as *Tarsonemus pallidus*, and ticks, and the like.

Thus the new compounds of the instant invention can be used as pesticides either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols( for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), ketones (for instance, acetone, etc.), and water; as well as dispersible finely divided solid carriers, such as natural ground minerals (for instance, kaolins, alumina, silica, chalk, i.e., calcium carbonate, talc, kieselguhr, etc.) and synthetic ground minerals (for instance, highly dispersed silicic acid, silicates, e.g., alkali silicates, etc.); whereas the following may be chiefly considered for use as carrier vehicle assistants for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier compositions mixtures in which the active compound is present in an amount substantially between about 0.1–95% by weight, and preferably 0.5–90% by weight of the mixture, whereas carrier composition mixtures suitable for direct application or field application generally contemplate those in which the active compound is present in an amount substantially between about 0.00001 and 20%, preferably 0.01 and 5% by weight of the mixture. Thus, the present invention contemplates overall compositions which comprise mixtures of a dispersible carrier vehicle such as a dispersible carrier solid, or a dispersible carrier liquid preferably including a carrier vehicle assistant such as an emulsifying agent or a dispersing agent, and an amount of the active compound which is effective for the purpose in question and which is generally between about 0.00001 and 95% by weight of the mixture. Specifically, the active compound may be applied to the agricultural area to be treated in concentrations substantially between about 1 and 10 kg. per hectare.

Furthermore, the present invention contemplates methods of combatting pests, especially insects and acarids, which comprises applying to at least one of (a) such pests, especially insects and/or acarids and (b) their habitat, a pesticidally, especially insecticidally and/or acaricidally, effective amount of the particular active compound of the invention alone or together with a carrier vehicle as noted above. The instant formulations or compositions are applied in the usual manner, for example, by spraying, atomizing, vaporizing, scattering, dusting, watering, sprinkling, pouring, and the like.

The following examples are given for the purpose of illustrating, while not limiting, the biocidal utility of the particular new compounds according to the present invention:

Example I.—Prodenia test

Solvent: 3 parts by weight acetone
Emulsifier: 1 part by weight alkylaryl polyglycol ether To produce a suitable preparation of the particular active compound, 1 part by weight of the given active compound is mixed with the stated amount of solvent containing the stated amount of emulsifier and the concentrate obtained is diluted with water to achieve the desired final concentration.

Cabbage leaves (*Brassica oleracea*) are sprayed with the preparation of the patricular active compound until dew mois and caterpillars of Prodenia litura are then placed on them.

After the specified period of time, the degree of destruction is determined percentagewise. 100% indicates that all of the caterpillars are killed, whereas 0% indicates that none of them is killed.

The active compounds, their concentrations, the evaluation time and the results obtained can be seen from Table I which follows:

The active compounds, their concentrations, the evaluation time and the results obtained can be seen from Table II as follows:

TABLE II.—(PLANT DAMAGING INSECTS)

| Active compound | | Concentration of active compound in percent | Degree of destruction in percent after 24 hours |
|---|---|---|---|
| (III″) | $CH_2=CH-CH_3$ / $CH_3$ / N-phenyl-$O-C(=O)-NH-CH_3$ with $CH_3$ substituents | 0.1<br>0.02<br>0.004<br>0.0008 | 100<br>100<br>95<br>0 |
| (A) (known) | $(CH_2=CH-CH_2)_2N$-phenyl($CH_3$, $CH_3$)-$O-C(=O)-NH-CH_3$ | 0.1<br>0.02<br>0.004 | 100<br>99<br>0 |
| (IV) | $CH_2=CH-CH_2$ / $CH_3$ / N-phenyl(iso-$C_3H_7$)-$O-C(=O)-NH-CH_3$ | 0.02<br>0.004<br>0.0008 | 100<br>100<br>98 |

TABLE I.—(PLANT DAMAGING INSECTS)

| Active compound | | Concentration of active compound in percent | Degree of destruction in percent after 3 days |
|---|---|---|---|
| (III′) | $CH_2=CH-CH_2$ / $CH_3$ / N-phenyl($CH_3$, $CH_3$)-$O-C(=O)-NH-CH_3$ | 0.1<br>0.02<br>0.004 | 100<br>80<br>45 |
| (A) (known) | $(CH_2=CH-CH_2)_2N$-phenyl($CH_3$, $CH_3$)-$O-C(=O)-NH-CH_3$ | 0.1<br>0.02 | 100<br>0 |

Example 2.—Myzus test (contact action)

Solvent: 3 parts by weight acetone
Emulsifier: 1 part by weight alkyl-aryl polyglycol ether.

To produce a suitable preparation of the particular active compound, 1 part by weight of the given active compound is mixed with the stated amount of solvent containing the stated amount of emulsifier and the concentrate obtained is diuluted with water to achieve the desired final concentration.

Cabbage plants (*Brassica oleracea*), which have been heavily infested with peach aphids (*Myzus persicae*), are sprayed with the preparation of the particular active compound until dripping wet.

After the specified period of time, the degree of destruction is determined percentagewise. 100% indicates that all of the aphids are killed, whereas 0% indicates that none of them is killed.

Example 3.—LT$_{100}$ test for Diptera

Test insect: *Aedes aegypti*
Solvent: acetone 2 parts by weight of the particular active compound are dissolved in 1000 parts by volume of solvent. The resultant solution is diluted with a further amount of solvent to achieve the desired lower final concentration.

2.5 ml. of the solution of the given active compound are transferred to a Petri dish by means of a pipette, a filter paper of about 9.5 cm. diameter being placed on the bottom of the Petri dish. The Petri dish is left uncovered until the solvent has completely evaporated. As the artisan will appreciate, the amount of active compound per square meter of filter paper varies with the concentration of the solution of active compound used. About 25 test insects are then placed in the Petri dish, which is covered with a glass lid.

The condition of the test insects is continuously observed. The period of time required for a 100% knock down effect ($LT_{100}$) is noted.

The active compounds, their concentration and the periods of time which bring about a 100% knock down effect, can be seen from Table III which follows:

TABLE III

| Active Compound | | Concentration of active compound, percent in solution | Knock down effect in percent |
|---|---|---|---|
| (III‴) | 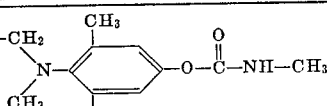 | 0.2<br>0.02<br>0.002 | 60 min.<br>120 min.<br>>3 hrs. |
| (A) (known) | 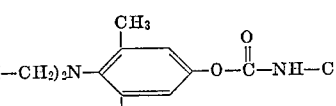 | 0.2<br>0.02 | 120 min.<br>>3 hrs. |

Example 4.—Tetranychus test

Solvent: 3 parts by weight acetone
Emulsifier: 1 part by weight alkylaryl polyglycol ether To produce a suitable preparation of the particular active compound, 1 part by weight of the given active compound is mixed with the stated amount of solvent containing the stated amount of emulsifier and the concentrate so obtained is diluted with water to achieve the desired final concentration.

Bush beans (*Phaseolus vulgaris*), which have a height of approximately 10–30 cm., are sprayed with the preparation of the particular active compound until dripping wet. The bush beans are heavily infested with spider mites (*Tetranychus telarius*) in all stages of development.

After the specified period of time, the effectiveness of the preparation of the given active compound is determined by counting the dead mites. The degree of destruction thus obtained is expressed percentage wise: 100% indicates that all of the spider mites are killed, whereas 0% indicates that none of them is killed.

The active compounds, their concentrations, the evaluation time and the results obtained can be seen from Table IV which follows:

19.1 grams (0.1 mol) of 3,5-dimethyl-4-(N-methyl-N-allyl-amino)-phenol are dissolved in 50 ml. of ligroin and mixed with 6.3 g. (0.11 mol) of methyl isocyanate and 3 drops of triethylamine. During the reaction, the temperature increases from 25 to 45° C. To complete the reaction, the mixture is briefly heated to 60° C. and allowed to stand overnight. The solution is then washed in rapid succession with cold 2 N sodium hydroxide solution and water to which a few drops of hydrochloric acid have been added. The solution is then dried over anhydrous sodium sulfate and, after the addition of benzene, the solvent mixture is distilled off under vacuum, with 3,5-dimethyl - 4 - (N - methyl - N - allylamino) - phenyl-N′-methyl-carbamate remaining as a slightly yellow oil.

The 3,5 - dimethyl - 4 - (N - methyl - N - allyl-amino)-phenol used as starting material can be prepared as follows:

1 mol of 3,5-dimethyl - 4 - aminophenol is suspended at room temperature in 460 ml. water. 110 ml. of dimethyl sulfate are added dropwise, with vigorous stirring, the temperature rising to 40° C. The dark solution thus obtained is largely decolorized with activated charcoal and then neutralized with a concentrated solution of sodium hydroxide. The product is thus precipitated in the form of an oil, which crystallizes immediately and completely. After recrystallization from benzene, 3,5-dimethyl-4-methyl-aminophenol which melts at 130–131° C. is obtained.

75.5 grams (0.5 mol) of 3,5-dimethyl-4-methyl-aminophenol and 83 g. of sodium bicarbonate are suspended in

TABLE IV.—(PLANT DAMAGING MITES)

| Active compound | | Concentration of active compound in percent | Degree of destruction in percent after 8 days |
|---|---|---|---|
| (III‴) | 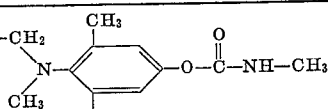 | 0.1<br>0.02<br>0.004 | 100<br>70<br>0 |
| (A) (known) | 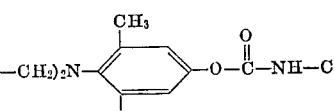 | 0.1<br>0.02 | 98<br>0 |

The following examples are given for the purpose of illustrating, while not limiting, the preparation process for producing the new compounds of the present invention:

Example 5

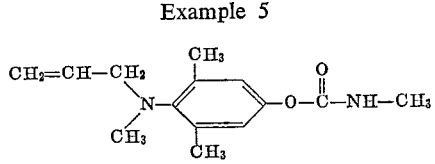

(III‴″)

270 ml. of water. 88 grams of allyl bromide are added dropwise at 40–50° C., with vigorous stirring. Stirring is continued at room temperature for several hours, a further 30 g. of sodium bicarbonate and 30 g. of allyl bromide are added and stirring is continued at 40–50° C. for one hour. The reaction mixture is then cooled and extracted with benzene. After drying the benzene extract, the solvent is evaporated and the residue distilled in a vacuum. 3,5 - dimethyl - 4 - (N - methyl - N - allyl - amino)-phenol is thus obtained with a boiling point of 158–162° C./14 mm. Hg.

Example 6

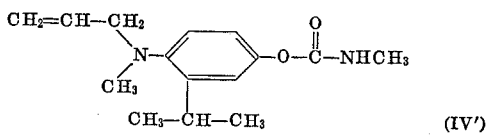

(IV')

Under conditions analogous to those described in Example 5 above, 21.5 g. of 3-isopropyl-4-(N-methyl-N-allyl-amino)-phenyl-N'-methyl carbamate (M.P. 74° C.) are obtained from 20.5 g. (0.1 mol) of 3-isopropyl-4-(N-methyl-N-allyl-amino)-phenol with 6.3 g. methyl isocyanate.

The 3-isopropyl-4-(N-methyl-N-allyl-amino)-phenol used as starting material is prepared in the same manner as the 3,5-dimethyl-4-(N-methyl-N-allyl-amino)-phenol used in Example 5. For this purpose, 3-isopropyl-4-amino-phenol is methylated to form 3-isopropyl-4-(methyl-amino)-phenol (B.P. 173–176° C./14 mm. Hg; 122° C.) and this subsequently reacted with allyl chloride to give 3-isopropyl-4-(N-methyl-N-allyl-amino)-phenol (B.P. 124–133° C./0.8 mm. Hg).

It will be appreciated that the instant specification and examples are set forth by way of illustration and not limitation, and that various modifications and changes may be made without departing from the spirit and scope of the present invention which is to be limited only by the scope of the appended claims.

What is claimed is:
1. 4-(N-methyl-N-allyl-amino)-phenyl-N'-methyl carbamates having the formula

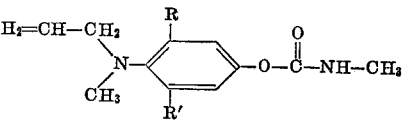

in which R is selected from the group consisting of methyl and hydrogen, and R' is methyl where R is methyl and isopropyl where R is hydrogen.

2. 3,5-dimethyl-4-(N-methyl-N-allyl-amino)-phenyl-N'-methyl carbamate having the formula

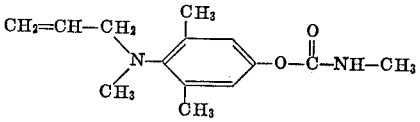

3. 3-isopropyl-4-(N-methyl-N-allyl-amino)-phenyl-N'-methyl carbamate having the formula

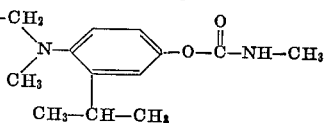

References Cited
UNITED STATES PATENTS
3,210,403  10/1965  Heiss et al. _____ 260—479

LORRAINE A. WEINBERGER, *Primary Examiner.*

M. G. BERGER, *Assistant Examiner.*

UNITED STATES PATENT OFFICE
CERTIFICATE OF CORRECTION

Patent No. 3,453,316                                           July 1, 1969

Rudolf Heiss et al.

It is certified that error appears in the above identified patent and that said Letters Patent are hereby corrected as shown below:

Column 4, line 72, "mois" should read -- moist --.
Column 6, Table II, the first formula should appear as shown below:

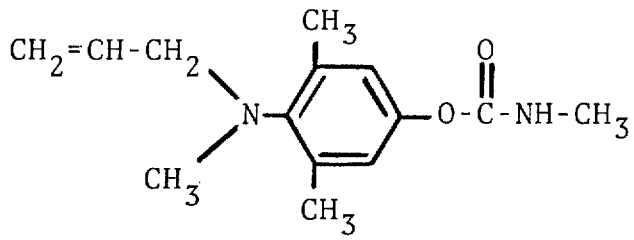

Column 9, line 24, after "Hg." insert -- m.p. --.

Signed and sealed this 5th day of May 1970.

(SEAL)
Attest:

EDWARD M. FLETCHER, JR.                        WILLIAM E. SCHUYLER, JR.
Attesting Officer                                     Commissioner of Patents